May 2, 1967 R. KOMPFNER 3,317,861
SPHERICAL REFLECTOR ELASTIC WAVE DELAY
DEVICE WITH PLANAR TRANSDUCERS
Filed Sept. 11, 1964 2 Sheets-Sheet 1
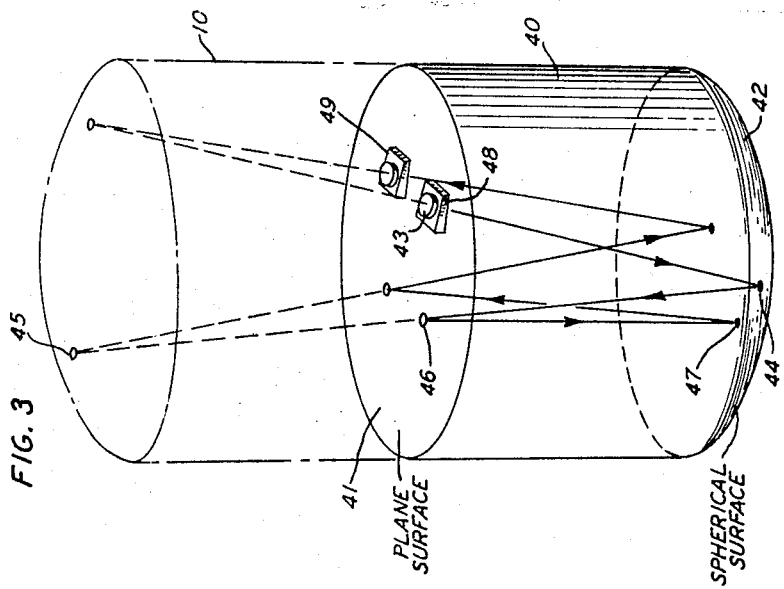
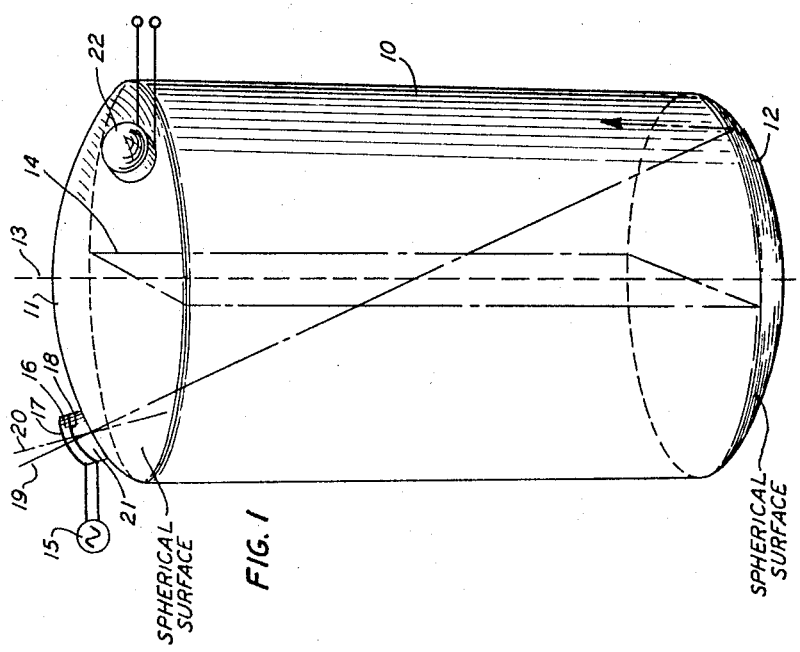
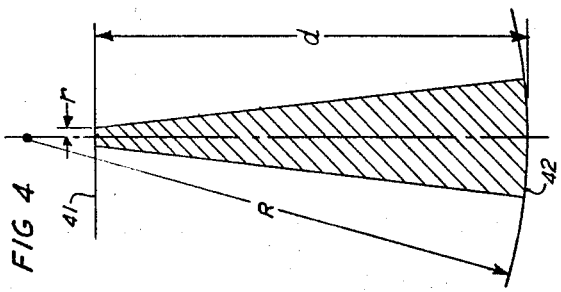
INVENTOR
R. KOMPFNER
BY
ATTORNEY

United States Patent Office 3,317,861
Patented May 2, 1967

3,317,861
SPHERICAL REFLECTOR ELASTIC WAVE DELAY DEVICE WITH PLANAR TRANSDUCERS
Rudolf Kompfner, Middletown, N.J., assignor to Bell Telephone Laboratories, Incorporated, New York, N.Y., a corporation of New York
Filed Sept. 11, 1964, Ser. No. 395,664
4 Claims. (Cl. 333—30)

This invention relates to ultransonic delay lines and more particularly to delay lines employing multiple reflections of an elastic wave beam within a body of elastic wave propagation material.

Ultrasonic devices such as delay lines take advantage of the fact that the velocity of propagation of an elastic vibration or ultrasonic wave is much lower than that of electrical signals by transforming the electrical signal into an ultrasonic wave, sending the ultrasonic wave down a mechanical path and converting the wave into an electrical signal at the far end. The amount of delay in a typical medium is determined by the physical length of the delay path and the velocity of elastic wave propagation therein.

In the copending application of A. H. Fitch, Ser. No. 395,666, filed on an even date herewith, a novel means is disclosed and claimed for increasing this delay time by producing multiple reflections of a directed beam of energy within a given body to increase the effective path length. In particular, an elastic wave transmission medium is formed having a pair of opposing reflecting surfaces each in the form of spherical segments. A beam of elastic wave energy is launched at one of these surfaces and directed against the other surface along a path displaced from the spherical axis of the surfaces. Such a beam will be reflected back and forth along non-interfering paths between the surfaces in a predictable and consistent pattern and at the same time will be repeatedly collected and refocused. In particular, the points of reflection on each of the surfaces are caused to fall along a closed curved pattern, either circular or elliptical, in which the angular spacing between successive points is determined by the ratio of the spacing between the reflectors to the radius of curvature of the spherical surface.

Since it is necessary that the launched beam have a wavefront corresponding to the curvature of the surface at which it entered, a spherically shaped piezoelectric transducer was located upon the entering surface to launch a beam having a spherical wavefront within the body. A second similarly shaped transducer was located either at another point on the same end or upon the other end for receiving elastic wave energy of spherical wavefront after multiple reflections between the ends. Tranducers of this shape are very difficult to form, are not usually readily available stock items and are difficult to bend efficiently to the spherical end surfaces.

It is therefore an object of the present invention to improve delay lines employing multiple reflections from a spherical surface.

It is a more specific object to introduce an ultrasonic wave having a plane wavefront for multiple reflection between a plane surface and a spherical surface.

In accordance with the present invention it has been recognized that one reflecting surface of a device similar to that described above may be plane and have associated with it a conventional, easily formed transducer launching waves of plane wavefront, while the other reflecting surface remains spherical if a certain relationship is approximated between the beam width of the launched plane wave and the physical dimensions of the system. In particular, a beam can be launched by a transducer of predetermined surface area of such width that after traveling the distance to the spherical surface the beam will have spread into one having a spherical front substantially corresponding to that of the surface. Reciprocally the reflected spherical wave will be converged to plane wavefront when it returns to the plane reflector.

According to a specific embodiment, one end of an elongated cylindrical body of fused silica is shaped as a spherical segment while the other end is shaped as a plane surface normal to the principal axis of the spherical surface. First and second piezoelectric transducers of particular dimensions are located upon the plane surface. These transducers are spaced from each other and from the spherical axis to respectively launch a beam of elastic wave energy directed within the body toward the spherical end and to receive elastic wave energy after multiple reflections between the ends.

Other objects and features, the nature of the present invention and its various advantages, will appear more fully upon consideration of the specific illustrative embodiments shown in the accompanying drawings and described in detail in the following explanation of these drawings, in which:

FIG. 1 is a perspective view of a multiple reflection delay line in accordance with the disclosure of the above-mentioned copending application and is given here for the purposes of explanation;

FIG. 3 is a perspective view of an illustrative embodiment of the present invention which represents an improvement upon the embodiment of FIG. 1; and FIG. 4 is a diagram useful for developing relationships for the embodiment of FIG. 3.

Figure 2:
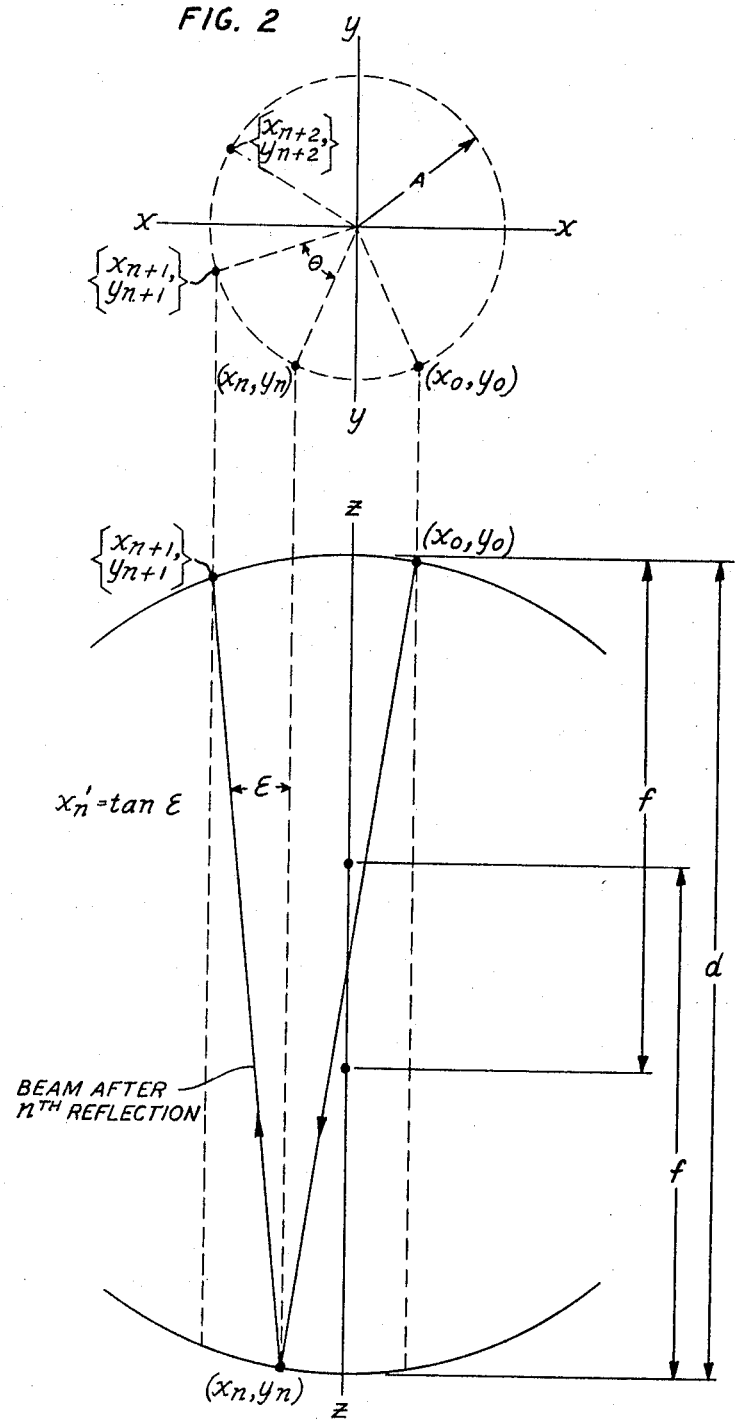
FIG. 2 is a diagram of coordinate relationships in the embodiment of FIG. 1 and is given for the purpose of explanation.

The details of the present invention may best be understood after reviewing its broad principles in terms of the embodiment disclosed and claimed in the above-mentioned copending application. Thus, FIG. 1 shows a cylindrical body 10 formed of any suitable elastic wave transmission material. For example, body 10 may be formed from an isotropic material such as glass or vitreous silica, or from a metal alloy of grain size small compared to the wavelength of the elastic wave to be supported. Body 10 has end surfaces 11 and 12 that are each machined or ground as segments of a sphere. While not necessary, it is preferable from the standpoint of initial design and explanation that each spherical surface has the same radius of curvature and that this radius be greater than the axial spacing between the surfaces. The effective center of each sphere is preferably located upon the common axis between them corresponding to axis 13 of cylinder 10 so that the surfaces form opposing coaxial spherical segments.

Means are provided upon surface 11 at a point removed from cylindrical axis 13 for launching a wave of elastic vibrations along a path within body 10 to be defined hereinafter. Preferably the wave should have a spherical wavefront at surface 11 that corresponds to the curvature of surface 11. While several transducer combinations including magnetostrictive, gyromagnetic and piezoelectric forms are known to the art which would meet these requirements, a preferred combination is illustrated which comprises a voltage source 15, representing the source of the signal to be delayed, applied to an ultrasonic piezoelectric transducer comprising a thin piezoelectric crystal or ceramic member 16 together with its conductive electrodes 17 and 18. This transducer is conventional except for the fact that both surfaces of member 16 have a curvature substantially corresponding to the curvature of surface 11 for the purpose of shaping the wavefront as required. Transducer 16–17–18 is oriented with respect to surface 11 so that the normal 19 to the spherical curvature of member 16 forms an angle with the normal 20 of surface 11 such that the beam falls upon the opposite cylindrical surface 12. More particularly, normal 19 lies in a tangential plane perpendicular to radial plane 14 of cylinder 10, and intersects plane 14 with a slope of the value to be specified hereinafter. Member 16 is supported and held in this position by a boss or protuberant part 21 either shaped from and formed integrally with surface 11 or separately formed and bonded to surface 11. Thus when piezoelectric element 16 vibrates in its characteristic mode, a beam of elastic wave energy is directed into body 10 along the direction of axis 19 and impinges upon surface 12 in a confined area which will be referred to hereinafter as a "spot." Surface 12 is characterized by a sharp acoustical impedance discontinuity which substantially completely reflects the elastic wave energy impinging on it. Further, the spherical shape of surface 12 affects the acoustical energy beam exactly as does a spherical mirror with an optical beam: condensing, refocusing and reradiating it along a reflected path toward surface 11 where it forms a second spot. At surface 11 the beam is again refocused and redirected towards surface 12. The delay line is completed by the addition of an output transducer 22, identical to input transducer 16-17-18 which may be located at a point on surface 11 spaced both from the input transducer and from axis 13 as will be described hereinafter, or at any one of similar points on surface 12. Wherever located transducer 22 converts the elastic wave arriving at it after several reflections between surfaces 11 and 12 into electrical energy for delivery to the output.

The specific pattern of reflection and rereflection may be better analyzed with the aid of the graphical presentation of FIG. 2. Thus, two generalized spherical reflectors each having a focal length $f$ (focal length being one-half the radius of curvature R) are spaced apart by a distance $d$ as shown. A beam after the $n$th reflection may be described by the coordinates $x_n$, $y_n$ at the point of its intersection with a reflector and by the slopes $x'_n$ and $y'_n$ for the beam after reflection. The beam as it is injected into the system may be similarly defined by the coordinates $x_o$, $y_o$ and the slopes $x'_o$, $y'_o$. By a straight-forward application of the principles of geometry it can be shown that $$x_n = x_o \cos n\theta + \sqrt{\frac{d}{4f-d}}(x_o + 2fx'_o) \sin n\theta \tag{1}$$

and that $$\cos \theta = 1 - \frac{d}{2f} \tag{2}$$

where $\theta$ is the polar angle between the point $x_n$, $y_n$ and the next point $x_{n+1}$, $y_{n+1}$. A similar relationship holds for $y_n$.

In a stable reflector system where $$0 < \frac{d}{f} < 4 \tag{3}$$

Equation 1 can be written as $$x_n = A \sin(n\theta + \alpha) \tag{4}$$

where $$\tan \alpha \sqrt{\frac{4f}{d} - 1} / \left(1 + 2f\frac{x'_o}{x_o}\right) \tag{5}$$

and $$A^2 = \frac{4f}{4f-d}(x_o^2 + dx_o x'_o + dfx'^2_o) \tag{6}$$

A is the maximum possible excursion of the beam in the $x$ direction. Similarly, $$y_n = B \sin(n\theta + \beta) \tag{7}$$

From Equations 4 and 7 it can be seen that the intersection of all points $x_n$, $y_n$ with the reflectors when projected onto a single $x$–$y$ plane, lie on an ellipse except where $$A = B \tag{8}$$

and $$\alpha = \beta \pm \frac{\pi}{2} \tag{9}$$

in which case they lie on a circle of radius A.

From Equations 4 and 5 the entrance conditions, i.e., those conditions determining the location $x_o$, $y_o$ and entrance slope $x'_o$, $y'_o$ for the beam in order for it to describe the circle may be determined. Calculations may be simplified by selecting the coordinates so that the $y$ axis falls between the entrance location and the first reflection point as shown in FIG. 2 in which case $y'_o = 0$. The radial plane passing through the $y$ axis thereby corresponds to the radial plane 14 referred to above in connection with FIG. 1. The coordinates $x_o$ and $y_o$ are determined directly from the desired radius A. Then, $x'_o$ is determined from Equations 4 and 5 as follows:

$$y_o^2 = x_o^2 \left(\frac{4f}{d} - 1\right) \tag{10}$$

$$A^2 = x_o^2 + y_o^2 = \frac{4f}{d}x_o^2 \tag{11}$$

$$x'_a = -\frac{2x_o}{d} = -\frac{A}{\sqrt{fd}} \tag{12}$$

It is thus seen that an acoustical beam injected into the system of FIG. 1 at the angle specified in Equation 12 will be reflected back and forth between surfaces 11 and 12, the spots on each describing the circle. If all spots occurring on both surfaces are projected onto one end with the odd numbered spots corresponding to those on one surface and the even numbered spots corresponding to those on the other, the sequence can be described by a single set of polar coordinates. Thus the angle $\theta$ as defined above by Equation 2 is the angle between spots on opposite surfaces and the angle $2\theta$ is the angle between spots on the same surface.

When $$2\theta = \frac{2\pi}{\nu} \tag{13}$$

$\nu$ represents the integral number of round trips after which the beam returns exactly to its entrance point. Equation 2 shows that spot separation is determined only by the ratio of $d$ to $f$ so that the number of round trips required to produce a desired delay time can be obtained by an appropriate ratio of $d$ to $f$. The maximum delay is limited by the ratio at which adjacent points begin to spill over onto each other which of course depends upon the physical size of each spot in terms of the physical radius of the spot circle.

In most applications it is desirable to remove the beam from the medium before it becomes re-entrant, that is, before it commences to retrace its path. To this end the output transducer may be located on the spot just preceding the input transducer or upon any spot preceding this.

While the entrance conditions defined above by Equation 12 are those that produce a circular spot pattern, it should be noted that this relationship is not ordinarily critical and that departure from it will only result in the pattern becoming elliptical. An elliptical pattern will perform satisfactorily in most applications.

A significant simplification in accordance with the present invention is illustrated in FIG. 4. The advantages of the embodiment of FIG. 4 may be best understood after recalling that in the embodiment of FIG. 1 special precautions were taken to launch an elastic wave having a front corresponding to the spherical curvature of the reflecting surface at which the wave entered. This required specially designed transducers which are difficult and expensive to form. With this background it may be seen that the embodiment of FIG. 4 comprises one-half of cylinder 10 of FIG. 1, truncated to form a cylinder 40 having a plane surface 41 as its top and a spherical surface 42 as its bottom. For comparison the outline of cylinder 10 is shown in phantom.

The simplified transducer mounting made possible is readily apparent. Thus, a standard, plane surfaced, piezoelectric transducer 43 is set on the tapered side of wedge 48, made of suitable elastic wave transmission material such as fused silica, which in turn is suitably bonded to the flat surface 41 of cylindrical body 40. The direction of the launched wave is determined by rotating the position of the wedge about an axis perpendicular to surface 41 before bonding.

The optimum dimensions of transducer 43 are such that the plane wave launched by it at surface 41 spreads into one having a spherical wavefront as it propagates into body 40 toward surface 42, and such that this spherical wavefront has the same curvature as surface 42 when the wave meets the surface. Sufficiently accurate relationships for practical purposes may be seen from FIG. 5. Thus, $d$ is the distance between surfaces 41 and 42, the latter having a radius of curvature R which is twice the focal length $f$. It is well known in optics that a spot source of radius $r$ will spread into a spherical wavefront having a radius of curvature R in a distance $d$ according to the relationship:

$$r^4 = \left(\frac{\lambda}{\pi}\right)^2 d(R-d) \qquad (14)$$

where $\lambda$ is the wavelength of the energy. This optical relationship assumes that the spot source has a Gaussian distribution of energy across its diameter which is only approximated in the acoustic energy generated by transducer 43. It is, however, sufficient for practical purposes that transducer 43 launch a beam of radius $r$ as defined by Equation 14 at surface 41. The effect is reciprocal, of course, so that the spherical front reflected by surface 42 will become a substantially plane front at surface 41.

The resulting spot sequence may be understood by tracing a beam launched by transducer 43 on plane surface 41 directed toward spot 44 of spherical surface 42. Reflections from spot 44 will be directed toward phantom spot 45 in accordance with the criteria developed above in connection with FIGS. 1 and 2 but will actually be intercepted and reflected at spot 46 on plane surface 41 toward a new spot 47, etc. Thus, it is seen that the presence of plane surface 41 in effect doubles the number of multiple reflection paths in the truncated body by producing in it a mirror image of the paths which would have continued into the full body. An output transducer 49 upon a suitably directed wedge and otherwise identical to transducer 43 is located upon the final spot on surface 41. It should be understood that the wedge-transducer combination specifically described represents only a preferred way in which the desired wave may be launched and alternatives will readily occur to those skilled in the art. For example, wedge 48 may be formed integrally with surface 41 from the same material comprising cylinder 40.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. An ultrasonic device comprising a pair of spaced acoustical reflectors disposed along a common axis, the first of said reflectors having a plane reflecting surface and the second having a spherical reflecting surface, means associated with said first reflector for directing a beam of elastic wave energy toward said second reflector along a path displaced away from said common axis, and means for receiving elastic wave energy after multiple reflections between said reflectors.

2. The delay device according to claim 1 wherein said surfaces are spaced apart by a distance $d$, said spherical surface has a radius of curvature R and wherein said transducers direct and receive a beam of elastic wave energy of wavelength $\lambda$ having a beam radius $r$ substantially according to the relationship $$r^4 = \left(\frac{\lambda}{\pi}\right)^2 d(R-d)$$

3. An ultrasonic delay line comprising a pair of spaced acoustical reflectors a first of which has a flat reflecting surface and a second of which has a spherical reflecting surface, an elastic wave energy transmission medium disposed along a common axis between said reflectors, a first transducer means upon the surface of said first reflector for converting an electrical signal into elastic wave energy directed toward said second reflector in a narrow beam displaced away from said common axis, and a second transducer means removed from said first transducer upon the surface of said first reflector for receiving elastic wave energy after multiple reflections between said reflectors and for converting said received energy into electrical signals.

4. An ultrasonic delay line comprising a solid body of isotropic material having one flat end surface and one sperical end surface symmetrical with an axis of said body, a first transducer means upon said flat surface for converting an electrical signal into a beam of elastic wave energy directed toward said spherical surface along a path displaced away from said common axis, and a second transducer means removed from said first transducer upon said flat surface for receiving elastic wave energy after reflection from said surface and for converting said received energy into electrical signals.

References Cited by the Applicant
UNITED STATES PATENTS

| | | |
|---|---|---|
| 2,558,012 | 6/1951 | Starr. |
| 2,685,067 | 7/1954 | Beveridge. |
| 2,753,528 | 7/1956 | Ashly. |

ROY LAKE, *Primary Examiner.*

D. HOSTETTER, *Assistant Examiner.*